United States Patent
Atisele

(10) Patent No.: US 11,174,715 B2
(45) Date of Patent: Nov. 16, 2021

(54) COUPLING ENHANCED OIL RECOVERY WITH ENERGY REQUIREMENTS FOR CRUDE PRODUCTION AND PROCESSING

(71) Applicant: Saudi Arabian Oil Company, Dhahran (SA)

(72) Inventor: Michael Atisele, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 228 days.

(21) Appl. No.: 16/436,317

(22) Filed: Jun. 10, 2019

(65) Prior Publication Data

US 2020/0386212 A1 Dec. 10, 2020

(51) Int. Cl.
| | |
|---|---|
| F03G 7/04 | (2006.01) |
| E21B 43/24 | (2006.01) |
| F01K 11/02 | (2006.01) |
| E21B 43/12 | (2006.01) |

(52) U.S. Cl.
CPC ............. *E21B 43/24* (2013.01); *F01K 11/02* (2013.01); *F03G 7/04* (2013.01); *E21B 43/128* (2013.01)

(58) Field of Classification Search
CPC .......... F03G 7/04; E21B 43/24; E21B 43/128; F01K 11/02; F01K 9/003; F01K 25/08; F01K 7/16; F01K 27/00; Y02E 10/10; F24T 10/00
See application file for complete search history.

(56) References Cited

U.S. PATENT DOCUMENTS

| | | |
|---|---|---|
| 4,074,754 A | 2/1978 | Christian |
| 4,824,447 A | 4/1989 | Goldsberry |
| 7,845,406 B2 | 12/2010 | Nitschke |
| 8,474,260 B2 | 7/2013 | Borissov |
| 2002/0178723 A1 | 12/2002 | Bronicki et al. |
| 2010/0045042 A1* | 2/2010 | Hinders .................. F24T 10/20 290/52 |
| 2011/0070099 A1* | 3/2011 | Schlenhoff ............ F04D 29/061 417/53 |
| 2011/0113786 A1 | 5/2011 | Rancruel et al. |
| 2011/0138809 A1 | 6/2011 | Ramaswamy et al. |
| 2011/0272166 A1* | 11/2011 | Hunt ....................... E21B 43/40 166/402 |
| 2012/0001429 A1* | 1/2012 | Saar ......................... F03G 7/04 290/52 |
| 2013/0043678 A1 | 2/2013 | Saar et al. |

(Continued)

OTHER PUBLICATIONS

PCT International Search Report and Written Opinion in International Application No. PCT/US2020/036,935, dated Sep. 11, 2020, 16 pages.

(Continued)

*Primary Examiner* — Michael R Wills, III
(74) *Attorney, Agent, or Firm* — Fish & Richardson P.C.

(57) ABSTRACT

Systems and methods for utilizing fluid produced from a geothermal source to generate electrical power and provide energy for upstream oil processing as part of a binary power generation station. Use of the geothermally-heated fluid continues in an enhanced oil recovery operation. Thermal energy of the geothermally-heated fluid heats a working fluid of a binary power generation plant to operate a turbine and to heat an oil heating medium as part of a gas-oil separation plant. The enhanced oil recovery operation may be a waterflooding operation.

17 Claims, 4 Drawing Sheets

(56) References Cited

U.S. PATENT DOCUMENTS

| | | |
|---|---|---|
| 2013/0255258 A1 | 10/2013 | Loveday |
| 2014/0109573 A1 | 4/2014 | Kalina |
| 2014/0130498 A1* | 5/2014 | Randolph ............... E21B 43/24 60/645 |
| 2015/0337690 A1 | 11/2015 | Adachi et al. |
| 2016/0362309 A1 | 12/2016 | Kiahghadi |
| 2017/0058711 A1 | 3/2017 | Noureldin et al. |

OTHER PUBLICATIONS

Akhmadullin, "Utilization of Co-Produced Water from Oil Production: Energy Generation Case,"SPE 184459-MS, presented at the SPE Health, Safety, Security, Environment & Social Responsibility Conference, North America, New Orleans, Louisiana, Apr. 18-20, 2017, 14 pages.
Averfalk et al., "Large Heat Pumps in Swedish District Heating Systems," Renewable and Sustainable Energy Reviews vol. 79, May 2017, 10 pages.
Dahlheim and Pike, "Generating Electricity from produced Water," Journal of Petroleum Technology, JPT, Dec. 2012, 3 pages.
Junrong et al., "Exploitation and Utilizing Technology of Geothermal Resources in Oil Fields," proceedings World Geothermal Congress, 2015, Melbourne, Australia, Apr. 19-25, 2015, 7 pages.
Nelson, "Examining the Technological Overlap Between Oil, Gas and Geothermal," Oct. 5, 2016, 4 pages.

\* cited by examiner

COUPLING ENHANCED OIL RECOVERY WITH ENERGY REQUIREMENTS FOR CRUDE PRODUCTION AND PROCESSING

TECHNICAL FIELD

This present disclosure relates to enhanced oil recovery.

BACKGROUND

Binary power generation involves utilizing geothermal energy, for example in the form of geothermally heated water or steam, to heat a working fluid. The working fluid generates power through a conventional Rankine cycle. For example, the working fluid may be used to operate a turbine.

SUMMARY

An aspect of the present disclosure is directed to a system for utilizing geothermal energy to generate electrical power and supply energy for upstream oil processing. The system may include a binary power generation station. The binary power generation station may include a first conduit defining a closed circuit; a working fluid disposed within the first conduit; a heat exchanger adapted to transfer thermal energy from a heat source to the working fluid to cause vaporization of the working fluid; a turbine coupled to the first conduit, the turbine adapted to rotate in response to the vaporized working fluid to produce work; a condenser coupled to the first conduit, the condenser adapted to transfer thermal energy to an oil heating medium for use in a gas oil separation plant and further adapted to condense the working fluid into a liquid; and a pump operable to circulate the working fluid in the first conduit.

Another aspect of the present disclosure is directed to a method of simultaneously generating electrical power and supplying energy to an upstream oil processing operation. The method may include extracting a geothermally-heated fluid from a geothermal source; transferring a portion of thermal energy from the geothermally-heated fluid to a working fluid of a binary power generation station so as to vaporize at least a portion of the working fluid; rotating a turbine of the binary power generation station; and transferring another portion of the thermal energy of the working fluid to an oil heating medium for use in a dehydration and stabilization in a gas-oil separation plant.

A further aspect of the present disclosure is directed to an apparatus for simultaneously generating electrical power and supplying energy to an upstream oil processing operation. The apparatus may include one or more processors and a non-transitory computer-readable storage medium coupled to the one or more processors and storing programming instructions for execution by the one or more processors. The programming instructions may be operable to instruct the one or more processors to: operate a pump to extract a geothermally-heated fluid from a geothermal source and conduct the geothermally-heated fluid to a heat exchanger of a binary power generation plant. Thermal energy of the geothermally-heated fluid is transferred to a working fluid of the binary power generation station to cause vaporization of at least a portion of the working fluid. The programming instructions also may be operable to instruct the one or more processors to: control a flow of the working fluid within a conduit of the binary power generation plant; control an amount of electrical power generated by a generator coupled to a turbine operated by a working fluid in response to a rotational speed of the turbine; control an amount of thermal energy transferred from the working fluid to an oil heating medium for use in a gas-oil separation station; and control a rate of injection of the geothermally-heated fluid into a subterranean reservoir by altering a pumping rate of the pump.

The various aspects may include one or more of the following features. A heat source may be received into the heat exchanger. The heat source may include a geothermally-heated fluid. A production well may be in fluid communication with a geothermal source from which the geothermally-heated fluid is obtained. A second conduit may extend from the production well to the heat exchanger of the binary power generation station. The second conduit may be adapted to conduct the geothermally-heated fluid to the heat exchanger. The geothermal source may have a temperature within a range of 150° F. to 170° F. (65.6° C. to 76.7° C.) and an enthalpy within a range of 270 kilojoules per kilogram (kJ/kg) to 320 kJ/kg. An electric submersible pump may be disposed in the production well to produce the geothermally-heated fluid from the geothermal source. An injection well may be in fluid communication with a subterranean reservoir and coupled to the second conduit. The injection well may be adapted to inject the geothermally-heated fluid into the subterranean reservoir as part of an enhanced oil recovery operation. The enhanced oil recovery operation may be a waterflooding operation. The oil heating medium may include materials such as diesel fuel or synthetic heating mediums such as Dowtherm® G, produced by Dow Chemical Company of 2030 Dow Center, Midland, Mich. 48674, or Addotherm® K-680, produced by Global Specialty Chemical Company of Riyadh, Saudi Arabia. An electrical generator may be coupled to the turbine and be adapted to generate electrical power in response to rotation of the turbine.

The various aspects of the present disclosure may also include one or more of the following features. Transferring a portion of thermal energy from the geothermally-heated fluid to a working fluid of a binary power generation station so as to vaporize at least a portion of the working fluid may include transferring the portion of thermal energy of the geothermally-heated fluid to the working fluid via a heat exchanger. An enhanced oil recovery operation may be performed with the geothermally-heated fluid. The enhanced oil recovery operation may be a waterflooding operation. The working fluid may be selected form a group consisting of butane, isobutane, pentane, isopentane, R32, R134a, R125, R143a, R152a, R23, and R218. The geothermally-heated fluid may include a temperature within a range of 150° F. to 170° F. (65.6° C. to 76.7° C.) and an enthalpy within a range of 270 kJ/kg to 320 kJ/kg. Extracting a geothermally-heated fluid from a geothermal source may include pumping the geothermally-heated from the geothermal source with an electric submersible pump disposed within a production well. The pump may be an electric submersible pump disposed in a production well in fluid communication with the geothermal source. Controlling an amount of thermal energy transferred from the working fluid to an oil heating medium for use in a gas-oil separation station may include controlling transfer of thermal energy from the working fluid to the oil heating medium such that the working fluid condenses back into a liquid. Transfer of a portion of thermal energy from a geothermally-heated fluid to a working fluid of a binary power generation station so as to vaporize at least a portion of the working fluid may be controlled.

The details of one or more embodiments of the present disclosure are set forth in the accompanying drawings and the description that follows. Other features, objects, and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
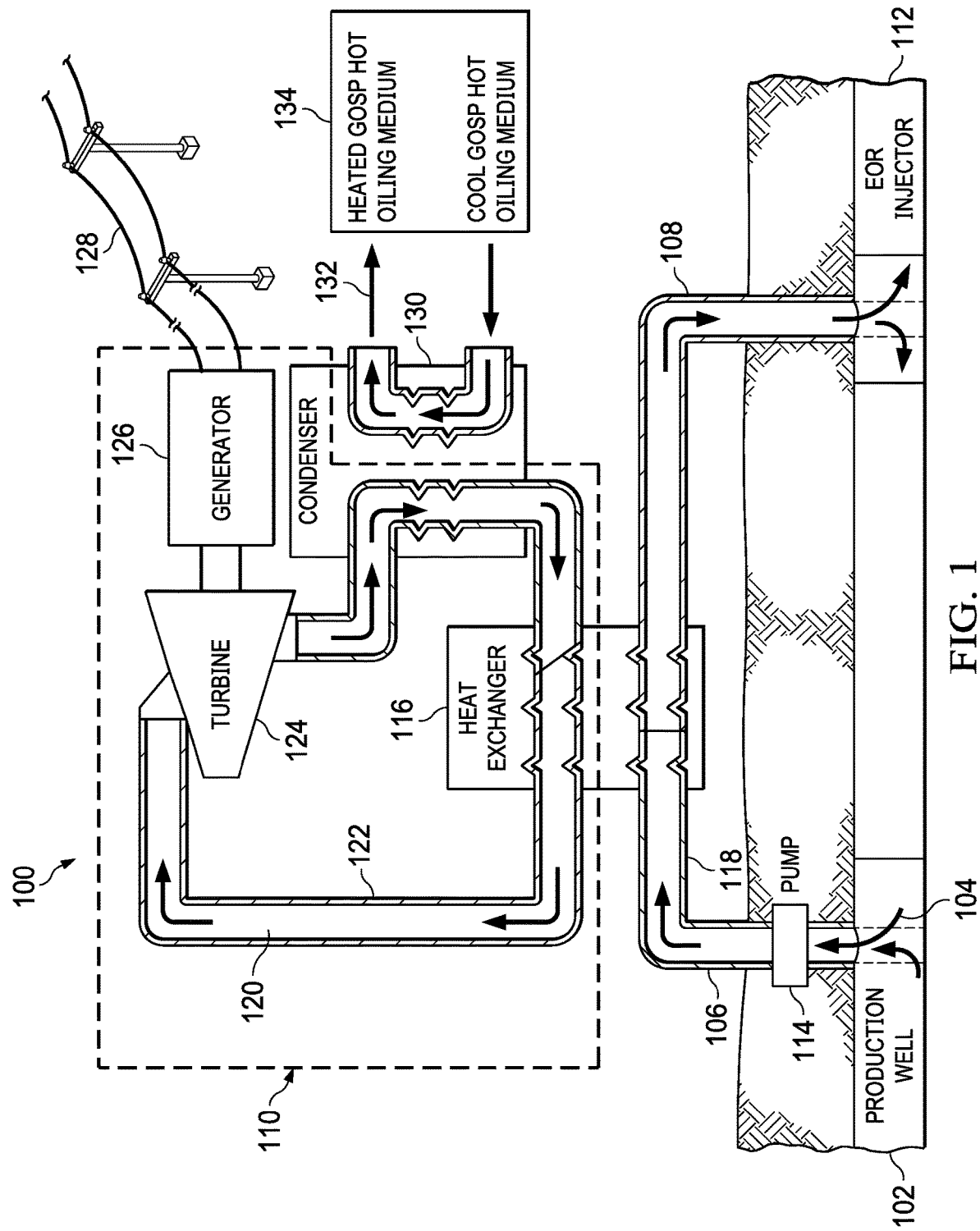
FIG. 1 is a schematic diagram of an example system for utilizing geothermal energy in oil production, according to some implementations of the present disclosure.

For the purposes of promoting an understanding of the principles of the present disclosure, reference will now be made to the implementations illustrated in the drawings, and specific language will be used to describe the same. Nevertheless, no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, steps, or a combination of such described with respect to one implementation may be combined with the features, components, steps, or a combination of such described with respect to other implementations of the present disclosure.

The present disclosure is directed to methods and systems for utilizing water obtained from a geothermal source to heat a working fluid and, thereafter, using the lower temperature water for secondary oil recovery. The working fluid is used for binary power generation and is condensed by transferring heat from the working fluid to an oil heating medium, thereby heating the oil heating medium for use in a gas oil separation plant. FIG. 1 is a schematic diagram of an example system 100 within the scope of the present disclosure. The system 100 includes a geothermal source 102 from which a geothermally-heated water 104 is obtained. The geothermally-heated water 104 is produced from the geothermal source 102 via production well 106. The production well 106 is a separate well that is unassociated with oil production. That is, the geothermally-heated water 104 obtained from the geothermal source 102 is not coproduced with oil. The system 100 also includes an injection well 108, and a binary power generation station 110.

The water produced from the geothermal source 102 may have an enthalpy of between approximately 270 kilojoules per kilogram (kJ/kg) to 320 kJ/kg or have a temperature in the range of 150° F. to 170° F. (65.6° C. to 76.7° C.) at a heat exchanger where heat from the water is transferred to a working fluid, as discussed in more detail later. A benefit of using water with the indicated example temperature range is that sources containing water with these properties are more abundant than sources containing water having higher temperatures, such higher temperature water being used in traditional geothermal technologies. Traditional geothermal technologies rely on water having temperatures up to 350° F. (176.7° C.), which are higher than the example temperature range described earlier. Geothermal sources containing water with these higher temperatures for use in traditional geothermal technologies may be difficult to locate and are less abundant than sources having comparably lower temperatures.

Although water from the geothermal source 102 may be within the range of 150° F. to 170° F. (65.6° C. to 76.7° C.) in some implementations, the scope of the disclosure is not so limited. Rather, in other implementations, the water may have a temperature and enthalpy higher than the range indicated above. For example, in some implementations, the water may have a temperature as high as 300° F. (148.9° C.) or 350° F. (176.7° C.). Thus, the enhanced oil recovery of the present disclosure is capable of using other geothermal sources, including geothermal sources containing water at higher temperatures used for traditional geothermal technologies. While example ranges of enthalpy and temperature are provided, the scope of the disclosure is not so limited. Rather, in other implementations, an enthalpy of a geothermal source 102 may be larger than the indicated, and the temperature may be larger than the indicated range.

Additionally, the geothermal source 102 need not be under positive pressure such that the geothermally-heated water 104 is self-producing. Rather, in some implementations, a pump, such as an electric submersible pump (ESP) 114, may be used to produce the geothermally-heated water 104 from the geothermal source 102. The geothermally-heated water 104 is conducted from the production well 106 to a heat exchanger 116. The geothermally-heated water 104 may be transported in a conduit 118, such as a pipe. The heat exchanger 116 transfers heat energy from the geothermally-heated water 104 to a working fluid 120 of the binary power generation station 110. The heat transfer causes the working fluid 120 to vaporize. In some implementations, most if not all of the working fluid 120 is vaporized into a gaseous state. In other implementations, less than all of the working fluid 120 may be vaporized into a gaseous state. In some implementations, the working fluid 120 includes a hydrofluorocarbon, such as R32, R134a, R125, R143a, or R152a. In other implementations, the working fluid 120 may include a perfluorocarbon, such as R23 or R218. In some implementations, a mixture of ammonia and water may also be used as the working fluid 120. In other implementations, the working fluid 120 may include isobutene, butane, isopentane, or pentane hydrocarbon. In still other implementations, other binary fluids may be used.

The heat transferred from the geothermally-heated water 104 to the working fluid 120 heats the working fluid 120. The heated working fluid 120 is used as part of a Rankine cycle where the working fluid 120 is transferred, via a conduit 122 (such as a pipe), to a turbine 124. The conduit 122 forms a closed, continuous circuit through which the working fluid is circulated. The working fluid 120 rotates the turbine 124 to produce work. The turbine 124 rotates a generator 126 to produce electrical power. The electrical power may be distributed via a power lines 128. In some implementations, the generated electrical power may be used, wholly or partially, to satisfy the energy needs for oil production or processing. The electrical power may be used to operate pumps, compressors, or other equipment associated with oil production. Other uses of the electric power are also contemplated, such as sale of excess generated power. These sales may further reduce costs associated with oil production.

As a result of passing through and rotating the turbine 124, the working fluid 120 loses energy and may be in a partially condensed state. Thermal energy remaining in the working fluid 120 is further utilized. After leaving the turbine 124, the working fluid 120 is conducted to a condenser 130. Additional thermal energy from the working fluid 120 is transferred to an oil heating medium 132, thereby heating the oil heating medium 132 to a higher temperature. Example oil heating mediums include, but are not limited to, diesel fuel or synthetic heating mediums such as Dowtherm® G, produced by Dow Chemical Company of 2030 Dow Center, Midland, Mich. 48674, or Addotherm® K-680, produced by Global Specialty Chemical Company of Riyadh, Saudi Arabia. Thus, the oil heating medium 132 is used has a heat sink, resulting in the partially condensed working fluid 120 condensing fully back into a liquid. In the illustrated example, the oil heating medium 132 is used for oil processing in a gas-oil separation plant (GOSP) 134. For example, the heated oil heating medium 132 may be transferred to the GOSP 134, such as by pumping, where the heated oil heating medium 132 is used for crude oil stabilization and wet crude dehydration processes associated with meeting true vapor pressure and water-in-oil content for produced oil. The heated oil heating medium 132 moves from the condenser, such as by pumping, is used to perform work in the GOSP 134, and is returned to the condenser with a lower energy state, and the process of heating the oil heating medium 132 and condensing the working fluid 120 repeats. A pump may be used to circulate the working fluid 120 in the conduit 122.

The working fluid 120 leaves the condenser 130 in a fully condensed state and returns to the heat exchanger 116, where the process repeats. By using the oil heating medium 132 as a heat sink, the efficiencies of the Rankine cycle are increased while the associated costs are decreased. Efficiencies are increased because excess thermal energy in the working fluid 120 is used to heat the oil heating medium 132 as opposed to losing that thermal energy as waste heat to the environment. In conventional binary power generation designs, excess thermal energy is released as waste heat to the environment. Costs are reduced because cooling towers to condense the working fluid 120 back in to a liquid before sending the working fluid 120 back to the heat exchanger 116 are avoided. Costs are also decreased because a separate fuel source, such as gas, is not required to heat the oil heating medium 132. In conventional oil heating designs, a separate fuel is used to heat an oil heating medium. Carbon emissions are also reduced by avoiding combusting a fuel source to heat the oil heating medium 132.

The geothermally-heated water 104 leaves the heat exchanger 116 with a lower temperature that an initial temperature the geothermally-heated water 104 had when introduced to the heat exchanger 116, and the geothermally-heated water 104 is introduced into the injection well 108 and injected into the hydrocarbon reservoir 112 in order to waterflood the hydrocarbon reservoir 112 as part of an enhanced oil recovery (EOR) technique. Waterflooding enhances oil recovery by replacing the produced crude oil with water. This water replacement maintains the field reservoir pressure above bubble point and efficiently sweeps the reservoir to maximize oil recovery. Further, because the geothermally-heated water 104 is at an elevated temperature and enthalpy, recovery of the oil during waterflooding is further enhanced by reducing the viscosity of the oil within the reservoir.

Using the geothermally-heated water 104 in this way achieves greater efficiency and reduced costs. For example, seawater is conventionally used in many locations in order to perform waterflooding of a subterranean reservoir. However, seawater has a drawback in that the temperature of seawater is insufficient and, hence, lacks an enthalpy level to effectively treat some subterranean reservoirs involving heavier crude oil. Consequently, when seawater is used, the seawater must first be heated, which incurs both a cost and an environmental impact. The geothermally-heated water 104 already includes temperature and enthalpy levels sufficient for EOR operations, even after passing through the heat exchanger 116, obviating any additional heating.

Also, seawater generally contains concentrations of materials (such as sulfates) that form scales within the subterranean reservoir having formation water with increased cation levels of calcium, barium, or strontium. These scales damage the subterranean reservoir. As a result, these materials must be removed from the seawater prior to injecting the seawater into the subterranean formation. Generally, an expensive processing plant, such as a sulfate removal facility, is used for processing the seawater prior to injection. By using the geothermally-heated water 104, use of seawater is avoided, which avoids the risk of damage to the reservoir as well as the costs associated with heating the seawater and removing the scale-producing materials from the seawater. This cost savings is even more appreciable, since these processing facilities must generally be replaced every four or five years, making this cost an ongoing one. Further, by avoiding heating of the seawater, which is generally accomplished by combusting a fuel, carbon emissions are reduced. Elimination of seawater may also eliminate processing for deoxygenation and treatment for sulfate reducing bacteria, as these concerns are largely absent in geothermal aquifers or wells.

As an oil field matures, production from a production well may include water along with the oil. This produced water may be injected into a geothermal source, such as geothermal source 102, to recharge the geothermal source 102. Alternatively or in addition, the produced water may be used to enhance the efficiency of the binary power generation station 110. The produced water includes sufficient thermal energy that may be transferred to the working fluid 120 to enhance the overall heat input to the binary power generation station 110.

Figure 2:
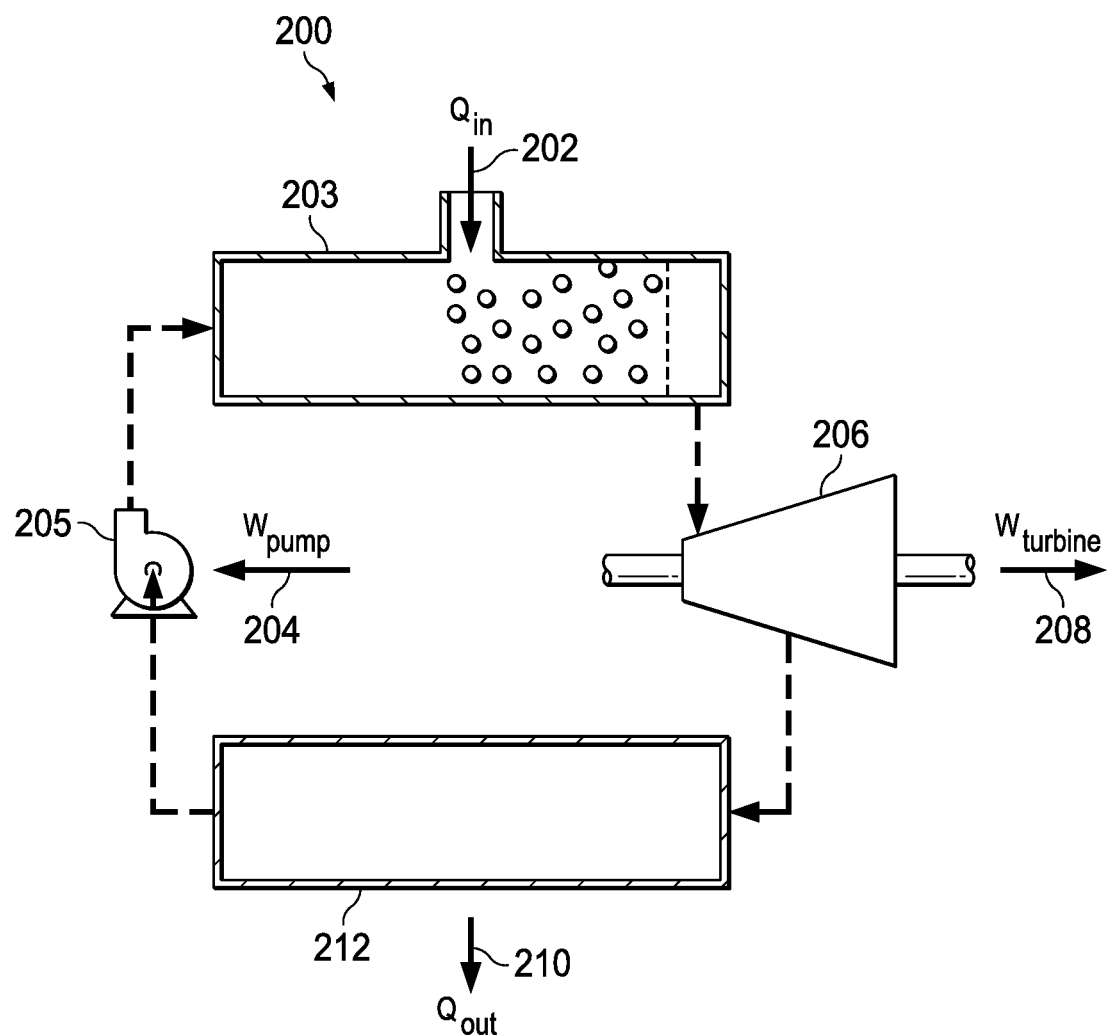
FIG. 2 a schematic diagram of an example binary power generation station, according to some implementations of the present disclosure.

FIG. 2 is a schematic diagram 200 of an example binary power generation station, which may be similar to the binary power generation station 110. The schematic diagram 200 shows an overview of an overall energy input and an overall energy output. $Q_{in}$ 202 represents energy extracted by a working fluid from a geothermal resource. The thermal energy may be transferred to the working fluid via a heat exchanger 203. The $Q_{in}$ 202 results in expansion of the working fluid. The working fluid may be similar to working fluid 120, described earlier, and the geothermal source may be a geothermally-heated fluid, such as the geothermally-heated water 104, also described earlier. In some implementations, the extracted energy from the geothermal source may be transferred to the working fluid via a heat exchanger. $W_{pump}$ 204 is an external work input used to circulate the working fluid through the binary power generation station. $W_{pump}$ 204 is provided by a pump 205 used to circulate the working fluid. As explained earlier, a working fluid may be circulated in a binary power generation station via a conduit, such as conduit 122. $W_{turbine}$ 208 is mechanical work performed by a turbine 206 as a result of the working fluid after receipt of $Q_{in}$ 202. The turbine 206 may be coupled to and operate a generator to produce electrical power. The turbine 206 may be similar to the turbine 124, discussed earlier. After passing through the turbine 206, the working fluid is in a partially condensed state, having lost energy as a result of rotating the turbine 206. $Q_{out}$ 210 is the thermal energy recovered from the working fluid by a medium, such as an oil heating medium used in a GOSP. $Q_{out}$ 210 may be transferred from the working fluid to the oil heating medium via a condenser 212. The oil heating medium, having a lower temperature than the working fluid, receives thermal energy from the working fluid, thereby causing the working fluid to condense. The pump recirculates the condensed working fluid.

In some implementations, modular binary power generation station may be used. A modular binary power generation station may be equipped with a pump used to circulate a working fluid, a motor coupled to the pump, a heat exchanger to extract heat from a geothermally-heated fluid, a turbine, and generator coupled to the turbine. The generator may be sized to generate 250 kW of power. The modular binary power generation station may also include a condenser exchanger for cooling the partially liquefied working fluid downstream of the turbine.

An installation using binary power generation as described in the present disclosure may utilize a plurality of modular binary power generation stations. The plurality of the modular binary power generation stations may be disposed in a parallel arrangement. In some implementations, all of the modular binary power generation stations may have a common inlet feed for the geothermally-heated fluid (such as geothermally-heated water). As explained earlier, the geothermally-heated fluid may subsequently be used for EOR. The plurality of modular binary power generation stations may also utilize a common condenser inlet feed. The common condenser inlet feed may receive a GOSP oil heating medium. In some implementations, the GOSP oil heating medium may be supplied from a central location.

Systems and methods employing a geothermally-heated fluid used to supply energy for binary power generation and used for EOR operations provide numerous benefits, some of which have already been described. Example benefits include cost savings associated with elimination of gas fired furnaces that would otherwise be needed to heat an oil heating medium for crude oil stabilization and wet crude processing in a GOSP. Additional cost savings and reduced system complexity are realized by elimination of a gas-fired cogeneration system that requires demineralized water. Additionally, the systems and methods described in the present disclosure have a reduced environmental impact due to reduced carbon dioxide ($CO_2$) emissions. The reduced CO2 emissions are realized by avoiding combustion of fuel to heat water, such as seawater, for EOR operations or combustion of fuel to heat an oil heating medium for use in a GOSP. Additional benefits include a cost saving associated with elimination of mineral removal facilities, such as sulfate removal facilities, that are needed when mineralized fluids, such as seawater, are used in EOR operations. Elimination of these types of mineralized fluids also avoids the risk of damaging a subterranean reservoir. The use of an oil heating medium in a GOSP to further cool the working fluid in a binary power generation station also avoids the need for one or more cooling towers that may otherwise be needed to condense the working fluid as part of the conventional Rankine cycle. Elimination of these cooling towers also provides sizable cost savings. Further, extracting heat from a geothermal source via a geothermally-heated fluid prior to injecting the geothermally-heated fluid as part of an EOR operation reduces wear and tear on downstream injection equipment, such as pipelines, coatings, and pump internals. Additionally, downstream equipment may be designed and manufactured with cheaper and less exotic materials.

Figure 3:
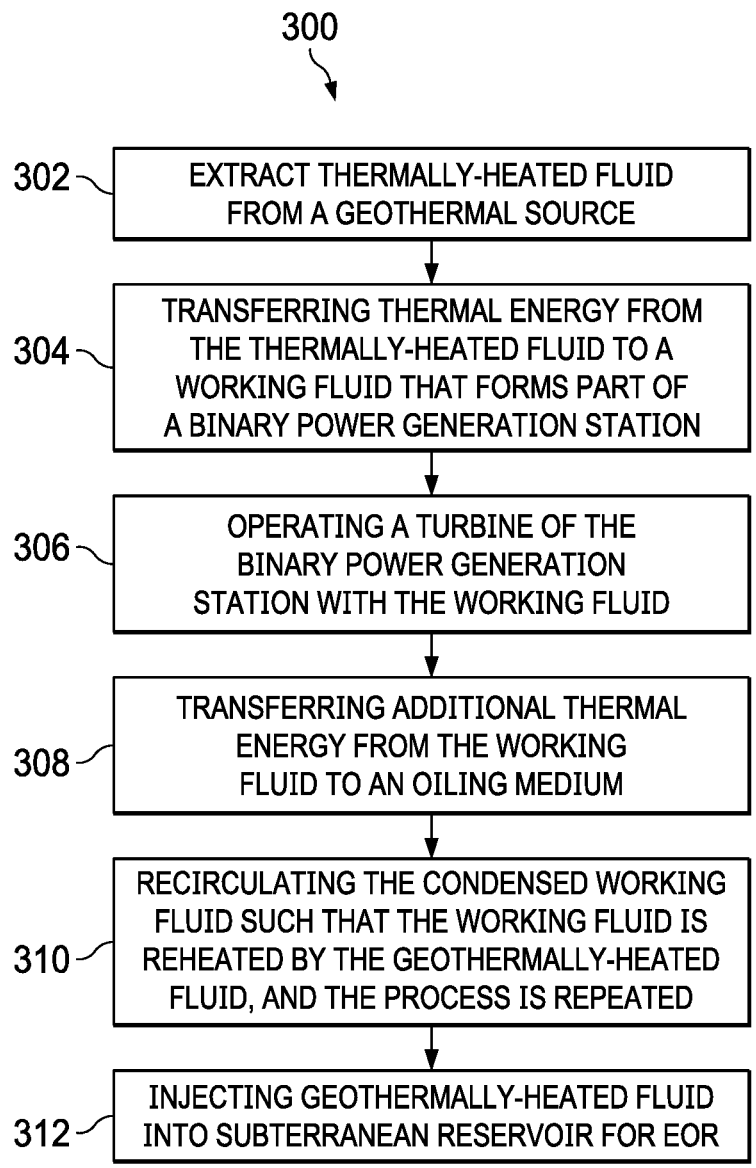
FIG. 3 is a flowchart of an example method of utilizing a geothermally-heated fluid for power generation and enhanced oil recovery, according to some implementations of the present disclosure.

FIG. 3 is a flowchart of an example method 300 of utilizing a geothermally-heated fluid for power generation and EOR. At 302, a geothermally-heated fluid is extracted from a geothermal source. The geothermally-heated fluid may be geothermally-heated water. The geothermally-heated fluid may be withdrawn from the geothermal source with a pump, such as an ESP. The water produced from the geothermal source may have a temperature within a range of 150° F. to 170° F., an enthalpy within a range of 270 kJ/kg to 320 kJ/kg, or both. However, as explained earlier, the temperature and enthalpy of the water may be higher than those in the indicated ranges. The geothermally-heated fluid is transported to a location where, at 304, a part of the thermal energy contained in the geothermally-heated fluid is transferred into a working fluid that forms part of a binary power generation station. The transfer of thermal energy may be accomplished using a heat exchanger. The working fluid may be R32, R134A, R125, R143a, R152a, R23, R218, isobutene, butane, isopentane, pentane, or other fluid suitable for use in a binary power generation station. The binary power generation station includes a turbine, and, at 306, the working fluid rotates the turbine, transforming a portion of the thermal energy of the working fluid into mechanical energy. In some implementations, the turbine may be coupled to and rotate a generator. The generator produces electrical power as a result. The electrical power may be used on site, transmitted for use at one or more remote locations, or both. The working fluid may be partially condensed upon leaving the turbine. At 308, additional thermal energy from the working fluid is transferred to an oil heating medium, causing a temperature increase of the oil heating medium. A condenser may be used to transfer the thermal energy from the working fluid to the oil heating medium. The oil heating medium may be used in a GOSP. In some implementations, the working fluid is fully condensed after transferring thermal energy to the oil heating medium. At 310, the condensed working fluid is recirculated, such that the working fluid is reheated by the geothermally-heated fluid, and the process is repeated. At 312, the geothermally-heated fluid injected into a subterranean reservoir for the purposes of EOR. The geothermally-heated fluid may be transported to an injection well, where the geothermally-heated fluid is injected into the subterranean reservoir via the injection well. In some implementations, the geothermally-heated fluid may be used to waterflood a reservoir to enhance oil production.

The following is an example illustrating energy savings associated with the systems and methods of the present disclosure. In this example, geothermally-heated fluid in the form of water is removed from a geothermal source at a flow rate of 5,300 gallons per minute (gpm), which is approximately 334.4 kilograms per second (kg/s) or about 180,000 barrels per day (bpd). The geothermally-heated water has a temperature of 165° F. (73.9° C.) at a location of a heat exchanger where heat is transferred from the water to a working fluid in a binary power generation station. At this temperature, the geothermally-heated water is capable of transferring 26.4 megawatts (MW) of heat to an R134a working fluid of a binary power generation station via an evaporator heat exchanger. As a result, the R134a is superheated. The superheated R134a is used to operate a turbine that is coupled to an electric generator. Mechanical energy, in the form of rotation of the turbine, is converted into electrical energy by the generator. As a result, 2.5 MW of electrical power are generated. Thermal energy remains in the R134a working fluid after departing the turbine and is used to heat an oil heating medium for use in a GOSP. An additional 23.6 MW of heat are subsequently transferred to the oil heating medium. The oil heating medium acts as a heat sink for the R134a working fluid. As a result of the thermal transfer, the R134a working fluid is condensed into a liquid. By heating the oil heating medium in this way, one or more conventional water cooling towers or air condensers that lose energy to the environment are eliminated.

By using geothermally-heated fluid in this way, heating of an oil heating medium for use in a GOSP by combusting a fuel (such as gas in a furnace) is avoided. Consequently, consumption of 23.6 MW of thermal energy via a combusted fuel is avoided. Estimated savings from not combusting a fuel correspond to approximately 26.2 tons of natural gas per hour (or 80.5 million BTU per hour (MMBTU/h)), resulting in annual cost savings of approximately $1.5 million (MM) (at $2.15/MMBTU). This cost saving excludes costs associated with generating electrical power and heating a fluid for use in EOR, such as waterflooding. Therefore, by using the systems and methods of the present disclosure, additional cost saving are realizable.

Figure 4:
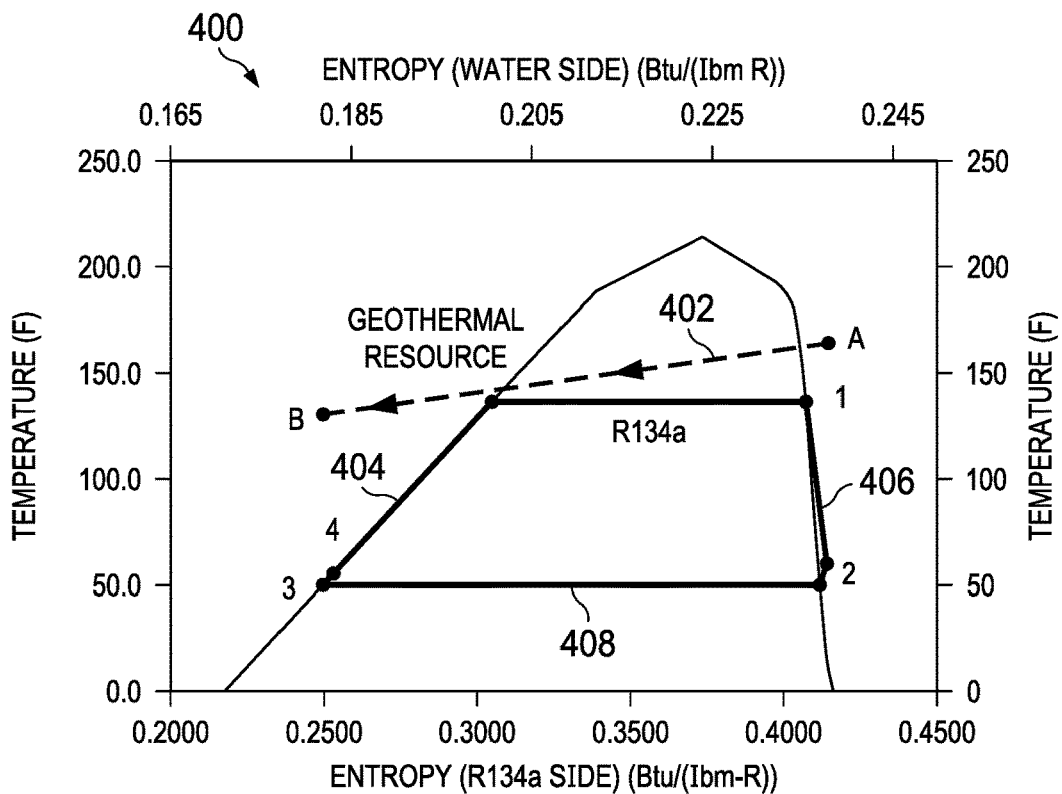
FIG. 4 is a Temperature versus Entropy (T-S) diagram showing the thermodynamic analysis of the Rankine cycle, according to some implementations of the present disclosure.

FIG. 4 is a Temperature versus Entropy (T-S) diagram 400 showing the thermodynamic analysis of the Rankine cycle associated with the previously-described example. Line 402 represents the change in enthalpy and temperature of the geothermally-heated fluid from the time the geothermally-produced fluid is produced to when the fluid exists a heat exchanger after having been used to heat the working fluid of the binary power generation station. This enthalpy change represents the energy introduced into the system, $Q_{in}$. Line 404 (extending from point 4 to point 1) is the liquid curve of R134a working fluid before the working fluid begins to vaporize as a result of the introduced energy $Q_{in}$. The $Q_{in}$ transferred to the working fluid represents the heat transferred from the geothermally-heated fluid to the working fluid. At point 1, the working fluid is superheated. Line 406 represents $W_{turbine}$ or the work produced by the turbine as a result of the working fluid. The work, $W_{turbine}$, corresponds to the decrease in energy of the working fluid as the working fluid expands through the turbine. Line 408 represent the de-superheated working fluid as the working fluid condenses after leaving the turbine. The energy change of the working fluid along line 408, $Q_{out}$, is the thermal energy transferred from the working fluid to the oil heating medium. $W_{pump}$, although not illustrated, is also part of the Rankine cycle and is energy supplied to pump the working fluid.

In this example, a temperature of the geothermal source is 165° F. The temperature of the geothermally-heated fluid when the fluid reaches an injection pump for injecting the geothermally-heated fluid as part of waterflooding is 130° F. The flow rate of the geothermally-heated fluid is 180,000 barrels per day (bpd) or 334.4 kg/s. With these characteristics, the geothermally-heated fluid transfers 26.4 MW of energy ($Q_{in}$) to the working fluid via a heat exchanger, where $Q_{in}$=mass×specific heat×change in temperature.

Figure 5:
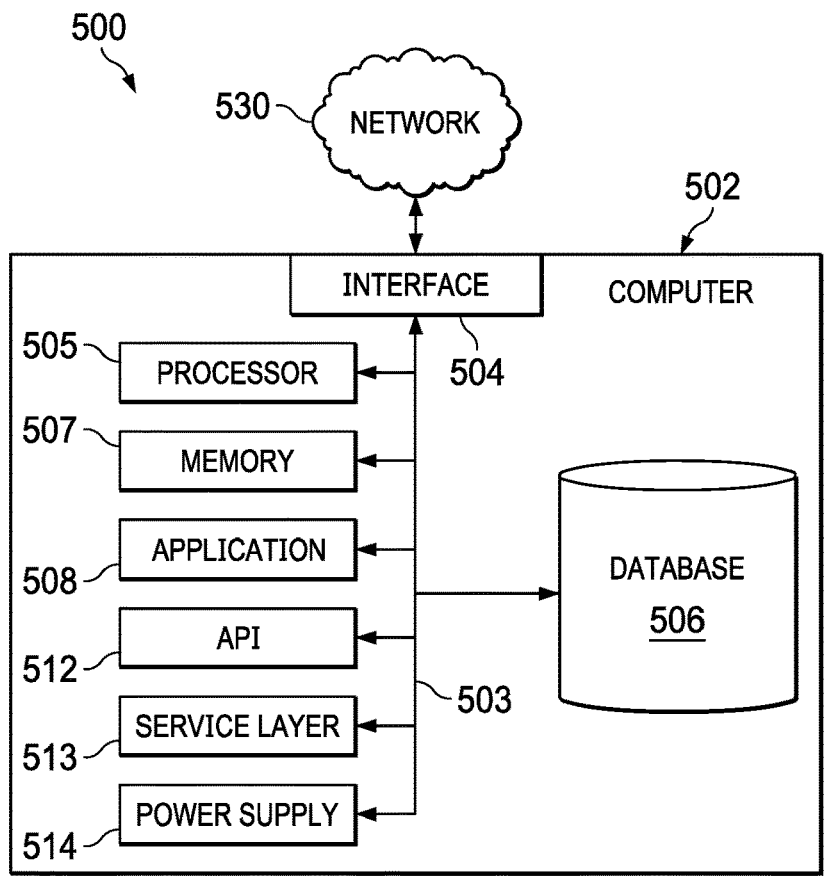
FIG. 5 is a block diagram illustrating an example computer system used to provide computational functionalities associated with described algorithms, methods, functions, processes, flows, and procedures as described in the present disclosure, according to some implementations of the present disclosure.

FIG. 5 is a block diagram of an example computer system 500 used to provide computational functionalities associated with described algorithms, methods, functions, processes, flows, and procedures described in the present disclosure, according to some implementations of the present disclosure. The illustrated computer 502 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 502 can include input devices such as keypads, keyboards, and touch screens that can accept user information. Also, the computer 502 can include output devices that can convey information associated with the operation of the computer 502. The information can include digital data, visual data, audio information, or a combination of information. The information can be presented in a graphical user interface (UI) (or GUI).

The computer 502 can serve in a role as a client, a network component, a server, a database, a persistency, or components of a computer system for performing the subject matter described in the present disclosure. The illustrated computer 502 is communicably coupled with a network 530. In some implementations, one or more components of the computer 502 can be configured to operate within different environments, including cloud-computing-based environments, local environments, global environments, and combinations of environments.

At a high level, the computer 502 is an electronic computing device operable to receive, transmit, process, store, and manage data and information associated with the described subject matter. According to some implementations, the computer 502 can also include, or be communicably coupled with, an application server, an email server, a web server, a caching server, a streaming data server, or a combination of servers.

The computer 502 can receive requests over network 530 from a client application (for example, executing on another computer 502). The computer 502 can respond to the received requests by processing the received requests using software applications. Requests can also be sent to the computer 502 from internal users (for example, from a command console), external (or third) parties, automated applications, entities, individuals, systems, and computers.

Each of the components of the computer 502 can communicate using a system bus 503. In some implementations, any or all of the components of the computer 502, including hardware or software components, can interface with each other or the interface 504 (or a combination of both), over the system bus 503. Interfaces can use an application programming interface (API) 512, a service layer 513, or a combination of the API 512 and service layer 513. The API 512 can include specifications for routines, data structures, and object classes. The API 512 can be either computer-language independent or dependent. The API 512 can refer to a complete interface, a single function, or a set of APIs.

The service layer 513 can provide software services to the computer 502 and other components (whether illustrated or not) that are communicably coupled to the computer 502. The functionality of the computer 502 can be accessible for all service consumers using this service layer. Software services, such as those provided by the service layer 513, can provide reusable, defined functionalities through a defined interface. For example, the interface can be software written in JAVA, C++, or a language providing data in extensible markup language (XML) format. While illustrated as an integrated component of the computer 502, in alternative implementations, the API 512 or the service layer 513 can be stand-alone components in relation to other components of the computer 502 and other components communicably coupled to the computer 502. Moreover, any or all parts of the API 512 or the service layer 513 can be implemented as child or sub-modules of another software module, enterprise application, or hardware module without departing from the scope of the present disclosure.

The computer 502 includes an interface 504. Although illustrated as a single interface 504 in FIG. 5, two or more interfaces 504 can be used according to particular needs, desires, or particular implementations of the computer 502 and the described functionality. The interface 504 can be used by the computer 502 for communicating with other systems that are connected to the network 530 (whether illustrated or not) in a distributed environment. Generally, the interface 504 can include, or be implemented using, logic encoded in software or hardware (or a combination of software and hardware) operable to communicate with the network 530. More specifically, the interface 504 can include software supporting one or more communication protocols associated with communications. As such, the network 530 or the interface's hardware can be operable to communicate physical signals within and outside of the illustrated computer 502.

The computer 502 includes a processor 505. Although illustrated as a single processor 505 in FIG. 5, two or more processors 505 can be used according to particular needs, desires, or particular implementations of the computer 502 and the described functionality. Generally, the processor 505 can execute instructions and can manipulate data to perform the operations of the computer 502, including operations using algorithms, methods, functions, processes, flows, and procedures as described in the present disclosure.

The computer 502 also includes a database 506 that can hold data for the computer 502 and other components connected to the network 530 (whether illustrated or not). For example, database 506 can be an in-memory, conventional, or a database storing data consistent with the present disclosure. In some implementations, database 506 can be a combination of two or more different database types (for example, hybrid in-memory and conventional databases) according to particular needs, desires, or particular implementations of the computer 502 and the described functionality. Although illustrated as a single database 506 in FIG. 5, two or more databases (of the same, different, or combination of types) can be used according to particular needs, desires, or particular implementations of the computer 502 and the described functionality. While database 506 is illustrated as an internal component of the computer 502, in alternative implementations, database 506 can be external to the computer 502.

The computer 502 also includes a memory 507 that can hold data for the computer 502 or a combination of components connected to the network 530 (whether illustrated or not). Memory 507 can store any data consistent with the present disclosure. In some implementations, memory 507 can be a combination of two or more different types of memory (for example, a combination of semiconductor and magnetic storage) according to particular needs, desires, or particular implementations of the computer 502 and the described functionality. Although illustrated as a single memory 507 in FIG. 5, two or more memories 507 (of the same, different, or combination of types) can be used according to particular needs, desires, or particular implementations of the computer 502 and the described functionality. While memory 507 is illustrated as an internal component of the computer 502, in alternative implementations, memory 507 can be external to the computer 502.

The application 508 can be an algorithmic software engine providing functionality according to particular needs, desires, or particular implementations of the computer 502 and the described functionality. For example, application 508 can serve as one or more components, modules, or applications. Further, although illustrated as a single application 508, the application 508 can be implemented as multiple applications 508 on the computer 502. In addition, although illustrated as internal to the computer 502, in alternative implementations, the application 508 can be external to the computer 502.

The computer 502 can also include a power supply 514. The power supply 514 can include a rechargeable or non-rechargeable battery that can be configured to be either user- or non-user-replaceable. In some implementations, the power supply 514 can include power-conversion and management circuits, including recharging, standby, and power management functionalities. In some implementations, the power-supply 514 can include a power plug to allow the computer 502 to be plugged into a wall socket or a power source to, for example, power the computer 502 or recharge a rechargeable battery.

There can be any number of computers 502 associated with, or external to, a computer system containing computer 502, with each computer 502 communicating over network 530. Further, the terms "client," "user," and other appropriate terminology can be used interchangeably, as appropriate, without departing from the scope of the present disclosure. Moreover, the present disclosure contemplates that many users can use one computer 502 and one user can use multiple computers 502.

Described implementations of the subject matter can include one or more features, alone or in combination.

For example, in a first implementation, a computer-implemented method for simultaneously generating electrical power and supplying energy to an upstream oil processing operation, comprising: extracting a geothermally-heated fluid from a geothermal source; transferring a portion of thermal energy from the geothermally-heated fluid to a working fluid of a binary power generation station so as to vaporize at least a portion of the working fluid; rotating a turbine of the binary power generation station; and transferring another portion of the thermal energy of the working fluid to an oil heating medium for use in a dehydration and stabilization in a gas-oil separation plant.

The foregoing and other described implementations can each, optionally, include one or more of the following features:

A first feature, combinable with any of the following features, the method also including performing an enhanced oil recovery operation with the geothermally-heated fluid.

A second feature, combinable with any of the previous or following features, in which transferring a portion of thermal energy from the geothermally-heated fluid to a working fluid of a binary power generation station so as to vaporize at least a portion of the working fluid includes transferring the portion of thermal energy of the geothermally-heated fluid to the working fluid via a heat exchanger.

A third feature, combinable with any of the previous or following features, in which the enhanced oil recovery operation is a waterflooding operation.

A fourth feature, combinable with any of the previous or following features, in which the working fluid is selected from a group consisting of diesel fuel or a synthetic heating medium such as Dowtherm® G or Addotherm® K-680.

A fifth feature, combinable with any of the previous or following features, in which the geothermally-heated fluid has a temperature within a range of 150° F. to 170° F. (65.6° C. to 76.7° C.) and an enthalpy within a range of 270 kJ/kg to 320 kJ/kg.

A sixth feature, combinable with any of the previous or following features, in which extracting a geothermally-heated fluid from a geothermal source includes pumping the geothermally-heated fluid from the geothermal source with an electric submersible pump disposed within a production well.

In a second implementation, a non-transitory, computer-readable medium storing one or more instructions executable by a computer system to perform operations including: operating a pump to extract a geothermally-heated fluid from a geothermal source and conduct the geothermally-heated fluid to a heat exchanger of a binary power generation plant, thermal energy of the geothermally-heated fluid transferred to a working fluid of the binary power generation station to cause vaporization of at least a portion of the working fluid; controlling a flow of the working fluid within a conduit of the binary power generation plant; controlling an amount of electrical power generated by a generator coupled to a turbine operated by a working fluid in response to a rotational speed of the turbine; controlling an amount of thermal energy transferred from the working fluid to an oil heating medium for use in a gas-oil separation station; and controlling a rate of injection of the geothermally-heated fluid into subterranean reservoir by altering a pumping rate of the pump.

The foregoing and other described implementations can each, optionally, include one or more of the following features:

A first feature, combinable with any of the following features, in which the geothermally-heated fluid has a temperature within a range of 150° F. to 170° F. (65.6° C. to 76.7° C.) and an enthalpy within a range of 270 kJ/kg to 320 kJ/kg.

A second feature, combinable with any of the previous or following features, in which the pump is an electric submersible pump disposed in a production well in fluid communication with the geothermal source.

A third feature, combinable with any of the previous or following features, in which one or more instructions executable by a computer system to perform operations to control an amount of thermal energy transferred from the working fluid to an oil heating medium for use in a gas-oil separation station include instructions to control transfer of thermal energy from the working fluid to the oil heating medium such that the working fluid condenses back into a liquid.

In a third implementation, a computer-implemented system, including one or more processors and a non-transitory computer-readable storage medium coupled to the one or more processors and storing programming instructions for execution by the one or more processors, the programming instructions instructing the one or more processors to perform operations including: operating a pump to extract a geothermally-heated fluid from a geothermal source and conduct the geothermally-heated fluid to a heat exchanger of a binary power generation plant, thermal energy of the geothermally-heated fluid transferred to a working fluid of the binary power generation station to cause vaporization of at least a portion of the working fluid; controlling a flow of the working fluid within a conduit of the binary power generation plant; controlling an amount of electrical power generated by a generator coupled to a turbine operated by a working fluid in response to a rotational speed of the turbine; controlling an amount of thermal energy transferred from the working fluid to an oil heating medium for use in a gas-oil separation station; and controlling a rate of injection of the geothermally-heated fluid into subterranean reservoir by altering a pumping rate of the pump.

The foregoing and other described implementations can each, optionally, include one or more of the following features:

A first feature, combinable with any of the following features, in which the geothermally-heated fluid has a temperature within a range of 150° F. to 170° F. (65.6° C. to 76.7° C.) and an enthalpy within a range of 270 kJ/kg to 320 kJ/kg.

A second feature, combinable with any of the previous or following features, in which the pump is an electric submersible pump disposed in a production well in fluid communication with the geothermal source.

A third feature, combinable with any of the previous or following features, in which the programming instructions that instruct the one or more processors to perform operations to control an amount of thermal energy transferred from the working fluid to an oil heating medium for use in a gas-oil separation station include programming instructions that instruct the one or more processors to control transfer of thermal energy from the working fluid to the oil heating medium such that the working fluid condenses back into a liquid.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of implementations of the present disclosure have been described. Nevertheless, it will be understood that various modifications may be made without departing from the spirit and scope of the present disclosure. For example, the systems described may be located on the site of oil production, and all or a portion of the generated electricity could be sold, thereby further reducing the costs associated with hydrocarbon production. Accordingly, other embodiments are within the scope of the following claims.

What is claimed is:

1. A system for utilizing geothermal energy to generate electrical power and supply energy for upstream oil processing, the system comprising:
    a binary power generation station comprising:
        a first conduit defining a closed circuit;
        a working fluid disposed within the first conduit;
        a heat exchanger adapted to transfer thermal energy from a heat source to the working fluid to cause vaporization of the working fluid;
        a turbine coupled to the first conduit, the turbine adapted to rotate in response to the vaporized working fluid to produce work;
        a condenser coupled to the first conduit, the condenser adapted to transfer thermal energy to an oil heating medium for use in a gas oil separation plant and further adapted to condense the working fluid into a liquid; and
        a pump operable to circulate the working fluid in the first conduit,
        wherein the oil heating medium is diesel fuel or a synthetic heating medium.

2. The system of claim 1, further comprising the heat source received into the heat exchanger, the heat source comprising a geothermally-heated fluid.

3. The system of claim 2, further comprising:
    a production well in fluid communication with a geothermal source from which the geothermally-heated fluid is obtained; and
    a second conduit extending from the production well to the heat exchanger of the binary power generation station, the second conduit adapted to conduct the geothermally-heated fluid to the heat exchanger.

4. The system of claim 3, wherein the geothermally-heated fluid comprises a temperature within a range of 150° F. to 170° F. (65.6° C. to 76.7° C.) and an enthalpy within a range of 270 kJ/kg to 320 kJ/kg.

5. The system of claim 3, further comprising an electric submersible pump disposed in the production well to produce the geothermally-heated fluid from the geothermal source.

6. The system of claim 3, further comprising an injection well in fluid communication with a subterranean reservoir and coupled to the second conduit, the injection well adapted to inject the geothermally-heated fluid into the subterranean reservoir as part of an enhanced oil recovery operation.

7. The system of claim 6, wherein the enhanced oil recovery operation is a waterflooding operation.

8. The system of claim 1, further comprising an electrical generator coupled to the turbine and adapted to generate electrical power in response to rotation of the turbine.

9. A method of simultaneously generating electrical power and supplying energy to an upstream oil processing operation, the method comprising:
   extracting a geothermally-heated fluid from a geothermal source;
   transferring a portion of thermal energy from the geothermally-heated fluid to a working fluid of a binary power generation station so as to vaporize at least a portion of the working fluid, wherein the working fluid is selected from a group consisting of butane, isobutane, pentane, isopentane, R32, R134a, R125, R143a, R152a, R23, and R218;
   rotating a turbine of the binary power generation station; and
   transferring another portion of the thermal energy of the working fluid to an oil heating medium for use in a dehydration and stabilization in a gas-oil separation plant.

10. The method of claim 9, wherein transferring a portion of thermal energy from the geothermally-heated fluid to the working fluid of the binary power generation station so as to vaporize at least a portion of the working fluid comprises transferring the portion of thermal energy of the geothermally-heated fluid to the working fluid via a heat exchanger.

11. The method of claim 9, further comprising performing an enhanced oil recovery operation with the geothermally-heated fluid.

12. The method of claim 11, wherein the enhanced oil recovery operation is a waterflooding operation.

13. The method of claim 9, wherein the geothermally-heated fluid comprises a temperature within a range of 150° F. to 170° F. (65.6° C. to 76.7° C.) and an enthalpy within a range of 270 kJ/kg to 320 kJ/kg.

14. The method of claim 9, wherein extracting the geothermally-heated fluid from the geothermal source comprises pumping the geothermally-heated fluid from the geothermal source with an electric submersible pump disposed within a production well.

15. An apparatus for simultaneously generating electrical power and supplying energy to an upstream oil processing operation comprising:
   one or more processors; and
   a non-transitory computer-readable storage medium coupled to the one or more processors and storing programming instructions for execution by the one or more processors, the programming instructions operable to instruct the one or more processors to:
      operate a pump to extract a geothermally-heated fluid from a geothermal source and conduct the geothermally-heated fluid to a heat exchanger of a binary power generation plant, thermal energy of the geothermally-heated fluid transferred to a working fluid of the binary power generation plant to cause vaporization of at least a portion of the working fluid, wherein the geothermal source comprises a temperature within a range of 150° F. to 170° F. (65.6° C. to 76.7° C.) and an enthalpy within a range of 270 kJ/kg to 320 kJ/kg;
      control a flow of the working fluid within a conduit of the binary power generation plant;
      control an amount of electrical power generated by a generator coupled to a turbine operated by the working fluid in response to a rotational speed of the turbine;
      control an amount of thermal energy transferred from the working fluid to an oil heating medium for use in a gas-oil separation station; and
      control a rate of injection of the geothermally-heated fluid into subterranean reservoir by altering a pumping rate of the pump.

16. The apparatus of claim 15, wherein the pump is an electric submersible pump disposed in a production well in fluid communication with the geothermal source.

17. The apparatus of claim 15, wherein programming instruction to control an amount of thermal energy transferred from the working fluid to an oil heating medium for use in a gas-oil separation station comprises programming instructions to control transfer of thermal energy from the working fluid to the oil heating medium such that the working fluid condenses back into a liquid.

* * * * *